United States Patent
Kikuchi

(10) Patent No.: US 9,272,720 B2
(45) Date of Patent: Mar. 1, 2016

(54) INFORMATION PROCESSING APPARATUS, COMMUNICATION TERMINAL, INFORMATION PROCESSING METHOD, AND PROGRAM

(71) Applicant: NTT DOCOMO, INC., Tokyo (JP)

(72) Inventor: Daisuke Kikuchi, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 14/356,423

(22) PCT Filed: Nov. 9, 2012

(86) PCT No.: PCT/JP2012/079135
§ 371 (c)(1),
(2) Date: May 6, 2014

(87) PCT Pub. No.: WO2013/069772
PCT Pub. Date: May 16, 2013

(65) Prior Publication Data
US 2014/0316619 A1    Oct. 23, 2014

(30) Foreign Application Priority Data

Nov. 11, 2011    (JP) ................. 2011-247486

(51) Int. Cl.
| | | |
|---|---|---|
| G01C 21/36 | (2006.01) | |
| B61L 25/04 | (2006.01) | |
| B61L 27/00 | (2006.01) | |
| B61L 15/00 | (2006.01) | |

(52) U.S. Cl.
CPC .............. *B61L 25/04* (2013.01); *B61L 15/009* (2013.01); *B61L 27/0027* (2013.01); *B61L 27/0077* (2013.01); *G01C 21/3691* (2013.01); *G01C 21/3697* (2013.01)

(58) Field of Classification Search
CPC ......... G01C 21/00; G01C 21/36; B61L 25/04
See application file for complete search history.

(56) References Cited

U.S. PATENT DOCUMENTS

| | | | |
|---|---|---|---|
| 2004/0127217 A1* | 7/2004 | Aoki et al. ................. | 455/435.1 |
| 2008/0140287 A1 | 6/2008 | Yang et al. | |

FOREIGN PATENT DOCUMENTS

| | | | | |
|---|---|---|---|---|
| JP | 2009104319 A | | 5/2009 | |
| JP | 2010-069910 | * | 4/2010 | ............. B61L 25/02 |
| JP | 2010069910 A | | 4/2010 | |
| SG | 173871 A1 | | 9/2011 | |

OTHER PUBLICATIONS

Office Action for Japanese Patent Application No. JP 2013-543045, dated Aug. 5, 2014.
PCT International Search Report issued in International Application No. PCT/JP2012/079135, date mailed Dec. 11, 2012, pp. 1-4.
Extended European Search Report issued in corresponding EP Application No. 12847417.8, dated Aug. 21, 2015, pp. 1-7.

* cited by examiner

*Primary Examiner* — Kim T Nguyen
(74) *Attorney, Agent, or Firm* — MKG, LLC

(57) ABSTRACT

Accident information determination server apparatus, when receiving a request from mobile communication terminal operated by a requester, specifies a train line, a terminal location, a moving direction, and a car number where mobile communication terminal that has made the request resides. Then, accident information determination server apparatus determines an impact of the accident represented by the accident information has on the requester who moves from the terminal location in the specified moving direction. Accident information determination server apparatus transmits a data that associates the accident information with the determined result on the accident information to mobile communication terminal.

8 Claims, 6 Drawing Sheets

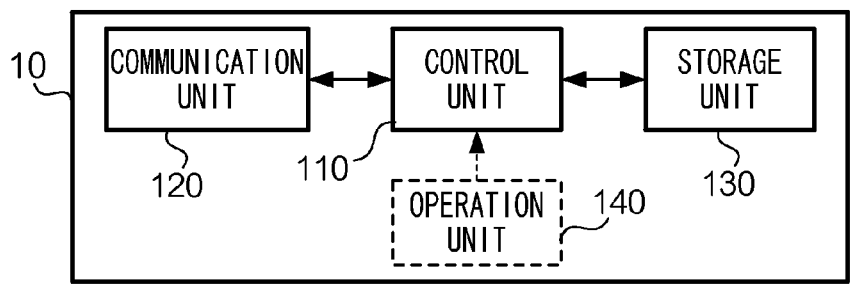
FIG. 4
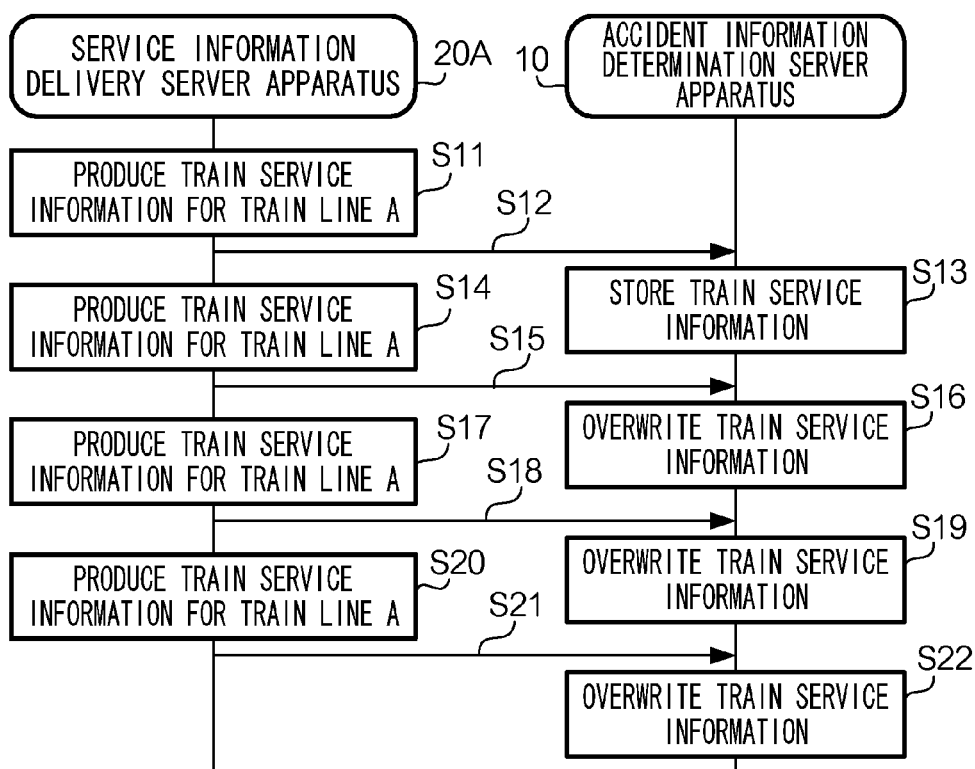
FIG. 5
| TRAIN LINE | SERVICE STATUS | SECTION | TIME OF OCCURRENCE | TRANSMISSION TIME | REASON |
|---|---|---|---|---|---|
| TRAIN LINE A | OPERATION SUSPENDED | WHOLE LINE | 13:05 | 13:08 | PERSONAL INJURY |
| TRAIN LINE A | OPERATION SUSPENDED | A4 STATION TO A8 STATION | 13:05 | 13:45 | PERSONAL INJURY |
| TRAIN LINE A | RESUME OPERATION/ OFF SCHEDULE | WHOLE LINE | 13:05 | 14:33 | PERSONAL INJURY |
| TRAIN LINE A | NORMAL OPERATION | WHOLE LINE | — | 15:30 | — |
FIG. 6

| TRAIN LINE | SERVICE STATUS | SECTION | TIME OF OCCURRENCE | TRANSMISSION TIME | REASON |
|---|---|---|---|---|---|
| CHUO LINE | DELAY 30 MINUTES | BOTH UPBOUND AND DOWNBOUND LINES FROM TOKYO TO TAKAO | 15:58 | 16:20 | PERSONAL INJURY |
| ODAKYU LINE | OPERATION SUSPENDED | BOTH UPBOUND AND DOWNBOUND LINES | 15:13 | 16:30 | LIGHTNING STRIKE |
| CHIYODA LINE | DIRECT OPERATION SUSPENDED | BOTH UPBOUND AND DOWNBOUND LINES | 15:13 | 16:15 | LIGHTNING STRIKE AT ODAKYU LINE |
| TOKAIDO SHINKANSEN | LIMITED OPERATION | TOKYO TO GIFUHASHIMA | 8:20 | 16:10 | SNOW |
| SOTOBO LINE | DELAY 30 MINUTES | BOTH UPBOUND AND DOWNBOUND LINES | 13:48 | 16:25 | PERSONAL INJURY |
| ECHIGO LINE | DELAY 40 MINUTES | UPBOUND LINE | 15:11 | 15:30 | TRAIN MALFUNCTION |

FIG. 7

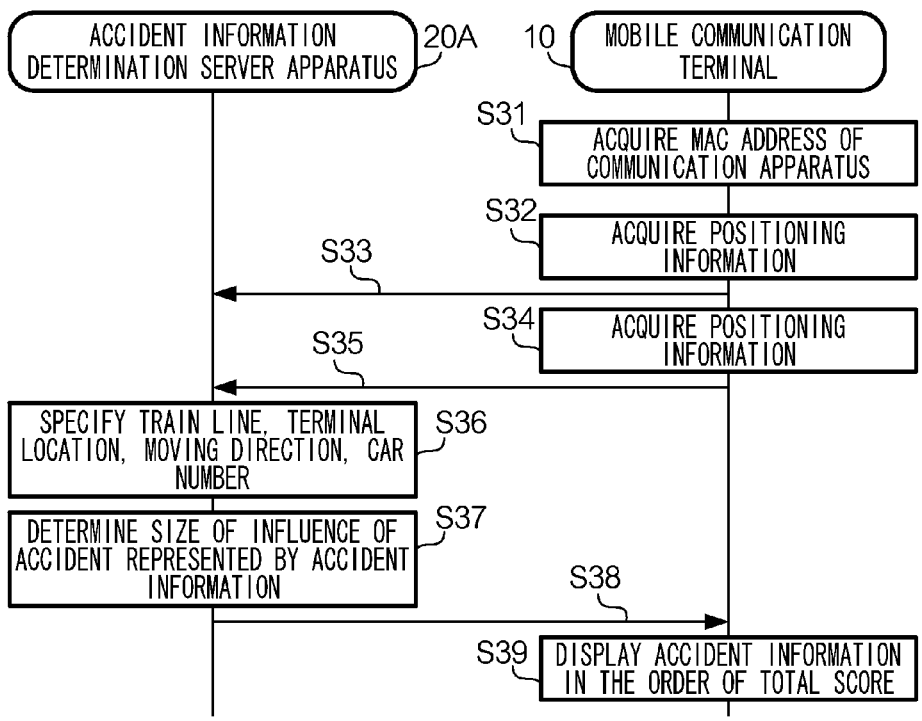

FIG. 8

| DETERMINED RESULT OF ACCIDENT INFORMATION DETERMINATION SERVICE ||||||
|---|---|---|---|---|---|
| YOUR CURRENT LOCATION: || ON THE WAY MOVING FROM A1 STATION TO A2 STATION ON TRAIN LINE A ||||
| TRAIN LINE | SERVICE STATUS | SECTION | TIME OF OCCURRENCE | REASON ||
| TRAIN LINE B | OPERATION SUSPENDED | WHOLE LINE | 12:11 | PERSONAL INJURY ||
| TRAIN LINE F | LIMITED OPERATION | F1 STATION TO F5 STATION | 9:00 | SNOW ||
| TRAIN LINE E | DELAY 20 MINUTES | UPBOUND LINE | 13:53 | TRAIN MALFUNCTION ||
| TRAIN LINE D | DELAY 50 MINUTES | WHOLE LINE | 13:08 | PERSONAL INJURY ||

FIG. 10

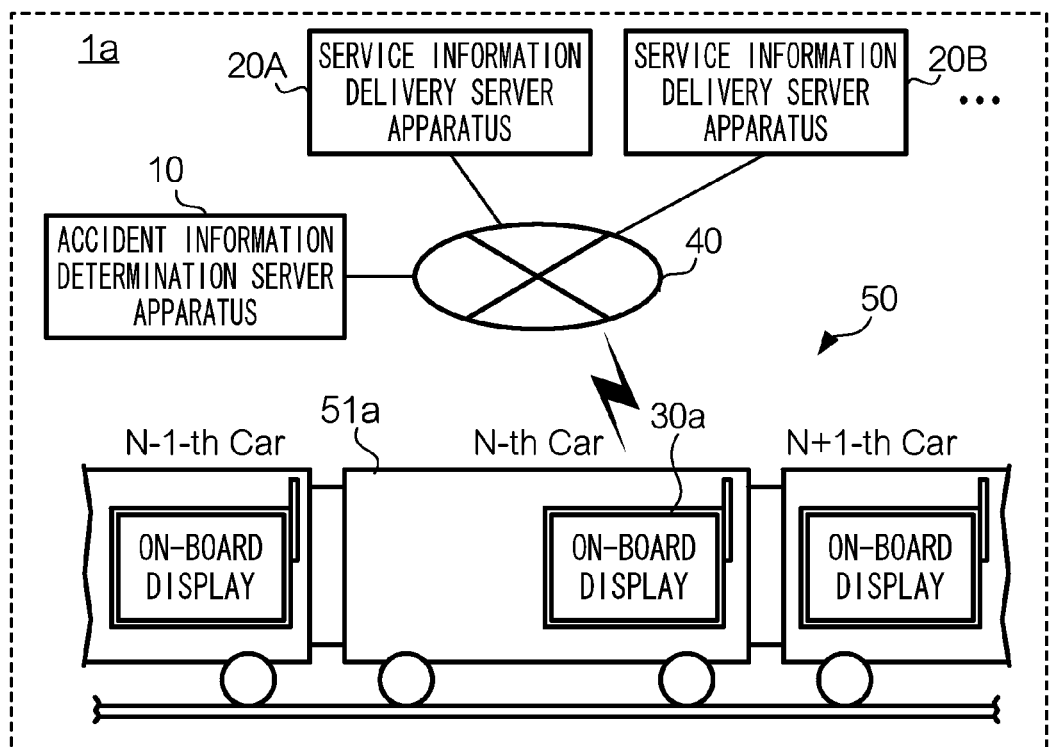

FIG. 12

INFORMATION PROCESSING APPARATUS, COMMUNICATION TERMINAL, INFORMATION PROCESSING METHOD, AND PROGRAM

TECHNICAL FIELD

The present invention relates to techniques for notifying a passenger about an influence of accidents that have occurred on train lines.

RELATED ART

There are techniques for providing, to passengers, information relating to accidents that have occurred on train lines on which vehicles run. JP2009-104319A describes a technique in which a user of a mobile terminal device registers train lines for which information is to be provided and a section of line to be ridden, in addition to a user ID and a mobile terminal ID, to a route searching server, and when a problem occurs on the registered train lines and the section of line to be ridden, the route searching server informs the mobile terminal device by an e-mail about the problem as train service information.

In many cases, multiple train lines are connected to form a wide range transport network. In such a transport network, when a case is considered in which a passenger is notified of accidents that have occurred on multiple train lines, the passenger may not understand immediately which accident affects the passenger greatly if the passenger is just provided such accident information as a list. With the technique described in JP2009-104319A, the passenger can know train service information that affects the passenger greatly, by registering the train lines and the section of line to be ridden that the passenger usually uses, for example. However, with this technique, unless the passenger has registered, in advance, the train lines that the passenger is planning to use, the passenger cannot know accidents on train lines that affect the passenger greatly.

The present invention enables the passenger to understand how an accident that has occurred on a train lines affects the passenger, even if the passenger does not register in advance the train lines that the passenger is planning to use.

SUMMARY

In order to address the above problem, there is provided an information processing apparatus comprising: an acquiring unit that acquires accident information representing an accident on a transport line in a transport network including a plurality of transport lines, the accident occurring during operation of the vehicles; a first specifying unit that specifies a terminal location and a moving direction, the terminal location showing a location of a communication terminal that notifies information to a passenger on one of the vehicles running on one of the transport lines, the moving direction being a direction of the communication terminal on the transport line; a determination unit that determines an impact of the accident represented by the accident information acquired by the acquiring unit, to the passenger who is moving from the terminal location specified by the first specifying unit in the moving direction; and a transmission unit that transmits accident information acquired by the acquiring unit and, associated with the accident information, impact information that represents the impact determined by the determination unit for that accident information to the communication terminal.

It is preferred that the vehicle may be a train including a plurality of cars, the information processing apparatus further comprising: a first storage unit that stores, for each stop where more than two transport lines are passing, in association, a first transport line that is passing the stop, a second transport line that can be transferred to from the first transport line at the stop, and a first car position, which is a position of the car that requires the shortest transfer time in a train on the first transport line that stops at that stop; and a second specifying unit that specifies a second car position, which is a position of the car in which the communication terminal resides in a train that stops at the stop, wherein the determination unit determines that the influence of an accident that has occurred on the second transport line, which is stored in the first storage unit associated with the first transport line and the first car position, is larger on the passenger in a car that is in the second car position, if the difference between the second car position specified by the second specifying unit on a train running on the first transport line and the first car position stored in the first storage unit associated with the first transport line is in a predetermined range, than in the case where the difference is not in the range.

It is preferred that wherein the determination unit specifies a distance of the shortest transport line route for the passenger who moves from the terminal location specified by the first specifying unit in the moving direction to a stop where more than one transport line is passing, and the determination unit determines that the shorter the specified distance, the larger the influence that is exerted on the passenger by an accident that has occurred on a transport line that can be transferred to at the stop when the passenger has moved on the transport line route for which the distance is specified.

It is preferred that the determination unit specifies the number of times the passenger changes vehicles on a transport line route in which the number of transfers that the passenger makes who moves from the terminal location specified by the first specifying unit in the moving direction to a stop where more than one transport lines is passing is minimal, and the determination unit determines that the lower that number of times, the larger the influence exerted on the passenger by an accident that has occurred on a transport line that can be transferred to at the stop when the passenger has moved on the transport line route.

It is preferred that Furthermore, the information processing apparatus includes a second storage unit that stores, in association, sections of respective transport lines, and numbers of passengers using the respective sections at predetermined time slots, wherein the determination unit specifies a time when the passenger is estimated to make the transfer, if the passenger moving from the terminal location specified by the first specifying unit in the moving direction changes transport lines at a stop where more than one transport line is passing, among the number of passengers stored in the second storage unit associated with the sections including the stop in the transport line to be transferred to, the determination unit references the number of passengers corresponding to the time slot including the specified time in the second storage unit, and the determination unit determines that the larger the referenced number of passengers is, the larger the influence that is exerted on the passenger by an accident that has occurred on the transport line to be transferred to.

It is preferred that a third storage unit that stores, in association, sections of respective transport lines, and numbers of passengers in each section corresponding to the moving direction and the time slot of the vehicle, wherein the determination unit specifies the sections included in the shortest transport line route for the passenger who moves from the terminal location specified by the first specifying unit in the moving direction to a stop where more than one transport line is passing, and the time when the passenger is estimated to use the respective section when the passenger has moved on the transport line route, the determination unit performs processing that calculates a value that is the number of passengers corresponding to the moving direction in the section at the specified time when the passenger has moved on the transport line route, among the number of passengers stored in the third storage unit associated with the specified section, divided by the distance of a part included in the transport line route among the section, and the determination unit determines that the larger the sum of the values calculated by performing the processing on respective sections included in the transport line route, the larger the influence that is exerted on the passenger by an accident that has occurred on a transport line to be transferred to at the stop when the passenger has moved on the transport line route.

It is preferred that the information processing apparatus includes a fourth storage unit that stores, in association, a reason why an accident occurs, and a time required to resolve the accident due to that reason, wherein the accident information includes a time of occurrence when the accident has occurred, and the reason why the accident has occurred, the determination unit specifies a first time when the passenger who moves along the shortest transport line route from the terminal location specified by the first specifying unit in the moving direction, and reaches a stop where more than one transport line is passing, the determination unit specifies a second time when a time has elapsed that is stored in the fourth storage unit in association with the reason included in accident information, from the time of occurrence included in the accident information acquired by the acquiring unit, and the determination unit determines that, if the second time is later than the specified first time, then, the larger the difference between the first time and the second time, the larger the influence that is exerted on the passenger by an accident that has occurred on a transport line that can be transferred to at the stop when the passenger has moved on the transport line route.

It is preferred that the determination unit specifies a time loss that the passenger suffers when the passenger uses a transport line on which an accident has occurred that is represented by the accident information, and determines that the larger the specified loss, the larger the influence that is exerted on the passenger by an accident represented by the accident information.

Further, there is provided a communication terminal comprising: an acquiring unit that acquires accident information representing an accident on a transport line in a transport network including a plurality of transport lines, the accident occurring during operation of the vehicles; a first specifying unit that specifies a terminal location and a moving direction, the terminal location showing a location of the communication terminal on the transport line, the moving direction being a direction of the terminal on the transport line; a determination unit that determines an impact of the accident represented by accident information acquired by the acquiring unit, to the passenger who is on a car on which the terminal resides, which is moving from the terminal location specified by the first specifying unit in the moving direction; and a display unit that displays accident information acquired by the acquiring unit in a manner corresponding to the size of the influence determined by the determination unit on the accident information.

Still further, there is provided information processing method comprising: acquiring, by an information processing apparatus, accident information representing an accident on a transport line in a transport network including a plurality of transport lines, the accident occurring during operation of the vehicles; specifying, by the information processing apparatus, a terminal location and a moving direction, the terminal location showing a location of a communication terminal that notifies information to a passenger on one of the vehicles running on one of the transport lines, the moving direction being a direction of the communication terminal on the transport line; determining, by the information processing apparatus, an impact of the accident represented by accident information acquired in the acquiring step has on the passenger who is moving from the terminal location specified in the first specifying step in the moving direction; and transmitting, by the information processing apparatus, accident information acquired in the acquiring step and, associated with the accident information, impact information representing the impact determined in the determination step for that accident information to the communication terminal.

Still further, there is provided an information processing method comprising: acquiring, by a communication terminal, accident information representing an accident on a transport line in a transport network including a plurality of transport lines, the accident occurring during operation of the vehicles; specifying, by the communication terminal, a terminal location and a moving direction, the terminal location showing a location of the terminal on the transport line, the moving direction being a direction of the terminal on the transport line; determining, by the communication terminal, the impact of an accident represented by accident information acquired in the acquiring step has on the passenger who is on a car on which the terminal resides, which is moving from the terminal location specified in the first specifying step in the moving direction; and displaying, by the communication terminal, accident information acquired in the acquiring step in a manner corresponding to the size of the influence determined in the determination step on the accident information.

Still further, there is provided a program causing a computer to execute a process, the process comprising: acquiring accident information representing an accident on a transport line in a transport network including a plurality of transport lines, the accident occurring during operation of the vehicles; specifying a terminal location and a moving direction, the terminal location showing a location of a communication terminal that notifies information to a passenger on one of the vehicles running on one of the transport lines, the moving direction being a direction of the communication terminal on the transport line; determining an impact of the accident represented by the acquired accident information has on the passenger who is moving from the specified terminal location in the moving direction; and transmitting the acquired accident information and, associated with the accident information, impact information that represents the impact determined for that accident information to the communication terminal.

Still further, there is provided a program causing a computer to execute a process, the process comprising: acquiring accident information representing an accident on a transport line in a transport network including a plurality of transport lines, the accident occurring during operation of the vehicles; specifying a terminal location and a moving direction, the terminal location showing a location of the terminal on the transport line, the moving direction being a direction of the terminal on the transport line; determining an impact of the accident represented by the acquired accident information has on the passenger who is on a car on which the terminal resides, which is moving from the specified terminal location in the moving direction; and displaying the acquired accident information in a manner corresponding to the size of the influence determined by the determination unit on the accident information.

According to the present invention, even if the passenger has not registered, in advance, the train lines that the passenger is planning to use, the passenger can understand how an accident that has occurred on a train line affects the passenger.

BRIEF DESCRIPTION OF DRAWINGS¥

FIG. 4 is a diagram illustrating a hardware configuration of an accident information determination server apparatus.

FIG. 5 is a sequence chart of a service information acquiring process.

FIG. 6 is a table illustrating an example of train service information.

FIG. 7 is a table illustrating an example of various accident information.

FIG. 8 is a sequence chart of accident information determination processing.

FIG. 10 is an example of an image displayed on a display unit of a mobile communication terminal.

FIG. 12 is a block diagram illustrating a general configuration of an accident information determination system according to Embodiment 2.

DETAILED DESCRIPTION

1. First Embodiment

In the following, Embodiment 1 of the present invention will be described, with reference to diagrams.

Figure 1:
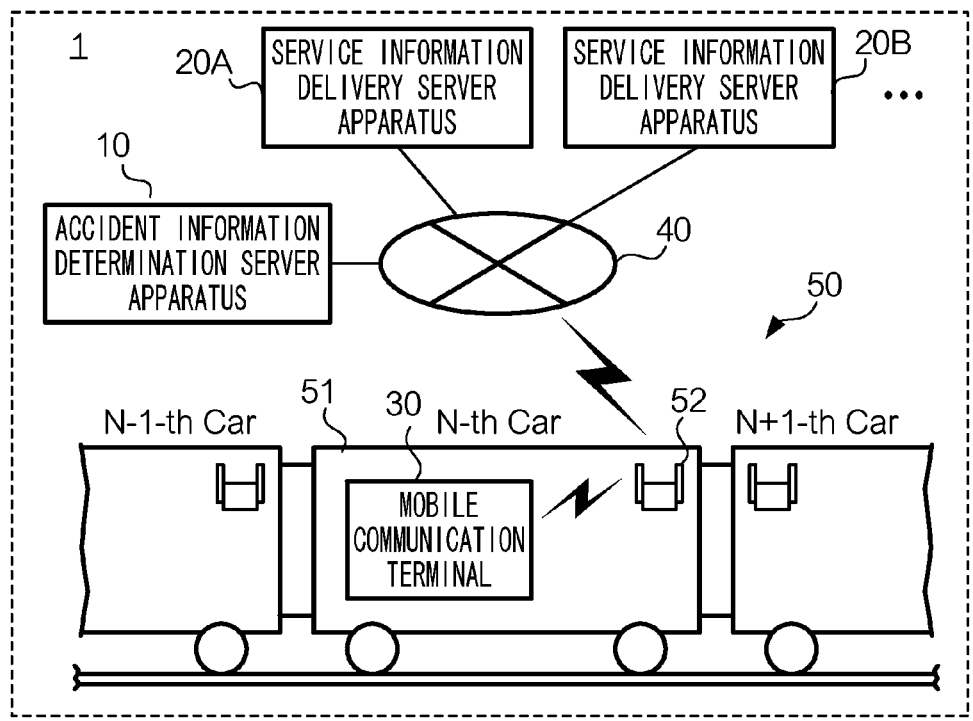
FIG. 1 is a block diagram illustrating an overall configuration of an accident information determination system according to Embodiment 1.

FIG. 1 is a block diagram illustrating an overall configuration of accident information determination system 1 according to Embodiment 1 of the present invention. Accident information determination system 1 is a system that determines how large the influence of accidents on a passenger is, the accidents having occurred on respective train lines during train operation in a transport network including plural train lines on which trains run. Here, "train line" refers to a train line on which trains run such as the Tokaido Line, Marunouchi Line, Tokyu Toyoko Line, for example, and where trains run on laid tracks. Also, "accident" here refers to a situation such as a train delay or suspension of train operation, and is a situation in which trains are not operated according to a predetermined schedule (so-called "train schedule").

For the train operation, there are situations in which an accident has occurred, and situations in which trains are operated as usual (so-called "normal operation"). Each railroad company that runs a train line included in the transport network produces train service information that shows the operating status of their respective train lines. For the train service information, there is accident information that indicates accidents and normal information that indicates a normal operation. Each railroad company provides the train service information to the train passengers by displaying it on displays installed in stations or trains, and by posting it on web pages. In accident information determination system 1, a service is provided in which it is determined how much the accident, which is indicated by the accident information provided by the railroad companies, affects the train passenger, and the passenger is notified of the determined result. Hereinafter, this is referred to as "accident information determination service".

Accident information determination system 1 includes accident information determination server apparatus 10, multiple service information delivery server apparatuses 20, mobile communication terminal 30, network 40, and communication apparatuses 52 that are provided at each car 51 of train 50 formed by multiple cars. Network 40 includes a mobile communication network, the internet, or the like. Communication apparatus 52 is, for example, an access point of a wireless LAN (Local Area Network), and communicates wirelessly with each of network 40 and mobile communication terminal 30. Accident information determination server apparatus 10 and each service information delivery server apparatus 20 communicate with each other through network 40, and accident information determination server apparatus 10 and mobile communication terminal 30 communicate with each other through network 40 and communication apparatus 52.

Multiple service information delivery server apparatuses 20 are respectively operated by different railroad companies, and are apparatuses to provide train service information of each train line to apparatuses that are determined by contract or the like. Each service information delivery server apparatus 20 produces train service information, e.g. when an accident occurs on an associated train line for example, and delivers the produced train service information. In the following diagrams including FIG. 1, the focus is on two of multiple service information delivery server apparatuses 20 (service information delivery server apparatuses 20A and 20B). These service information delivery server apparatuses 20A and 20B are respectively operated by railroad companies A and B.

Mobile communication terminal 30 is carried by a passenger who is on train 50, and moves together with train 50. In the present embodiment, the passenger who carries mobile communication terminal 30 is assumed to be on board on car 51, which is the N-th car of train 50 running on train line A. Mobile communication terminal 30 transmits information that represents the determination result notified by the accident information determination service to the passenger. Also, mobile communication terminal 30 is a communication terminal such as a mobile phone, a smartphone, a tablet terminal, a personal computer, or the like, and communicates wirelessly with network 40 through communication apparatus 52.

Accident information determination server apparatus 10 determines how much the accident, which is represented by the accident information, affects the passenger who is on car 51 on which mobile communication terminal 30 is located. Accident information determination server apparatus 10 accumulates, in advance, accident information included in the train service information that is delivered by multiple service information delivery server apparatus 20. Also, accident information determination server apparatus 10 notifies mobile communication terminal 30 of the determination result. Accident information determination server apparatus 10 is operated by a business operator who provides the accident information determination service.

Figure 2:
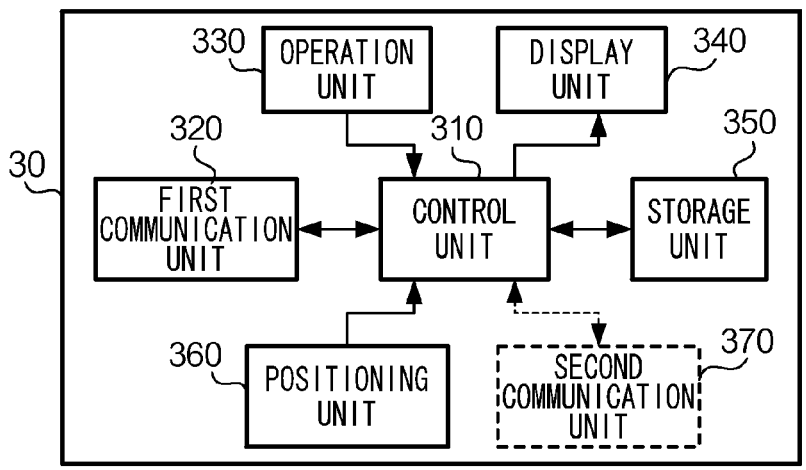
FIG. 2 is a diagram illustrating a hardware configuration of a mobile communication terminal.

FIG. 2 is a diagram illustrating a hardware configuration of mobile communication terminal 30. Mobile communication terminal 30 is a computer that includes control unit 310, first communication unit 320, operation unit 330, display unit 340, storage unit 350, and positioning unit 360. Control unit 310 includes an arithmetic apparatus such as a CPU (Central Processing Unit), or the like, and a storage apparatus such as a ROM (Read Only Memory) and a RAM (Random Access Memory). The CPU uses the RAM as a work area, executes a program stored in the ROM and storage unit 350, and controls operation of each unit in mobile communication terminal 30. First communication unit 320 includes a communication circuit that exchanges signals with communication apparatus 52, and communicates with accident information determination server apparatus 10 through network 40. Operation unit 330 includes multiple keys and a handler such as a touch sensor, and supplies an operation signal according to a user's operation to control unit 310.

Control unit 310 performs processing corresponding to the operation signal. Display unit 340 is a display means that includes a liquid crystal panel and an LCD driver, and displays an image on a display screen of the liquid crystal panel in response to the instruction by control unit 310. Storage unit 350 is a storage means such as a flash memory, a hard disk drive, or the like, for example, and stores data and programs that control unit 310 uses for control. Positioning unit 360 is a module that acquires positioning information by a predetermined positioning system. Here, "positioning information" refers to information representing the location of mobile communication terminal 30, and may be data representing the location by a combination of latitude and longitude, for example. Although the positioning system that positioning unit 360 uses may be, for example, GPS (Global Positioning System), any system that provides information that may be considered to be equivalent to the location of mobile communication terminal 30 will suffice. Positioning unit 360 provides the acquired location information to control unit 310.

Figure 3:
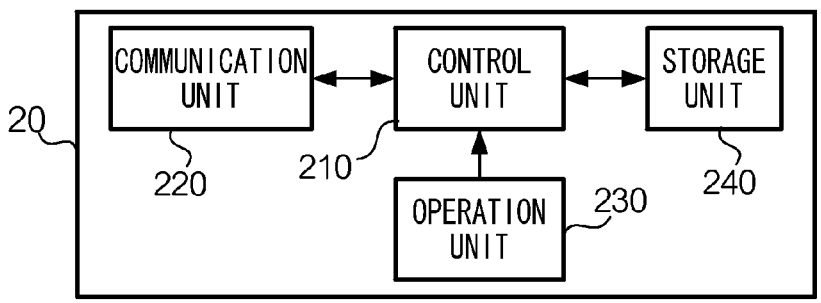
FIG. 3 is a diagram illustrating a hardware configuration of a service information delivery server apparatus.

FIG. 3 is a diagram illustrating a hardware configuration of service information delivery server apparatus 20. Service information delivery server apparatus 20 is a computer that includes control unit 210, communication unit 220, operation unit 230, and storage unit 240. Control unit 210 includes an arithmetic apparatus such as a CPU, and the like, and a storage apparatus such as a ROM and a RAM, and the like. The CPU uses the RAM as a work area, executes a program stored in the ROM and storage unit 240, and controls operation of each unit in service information delivery server apparatus 20. Communication unit 220 is connected to network 40, and transmits data to and receives data from accident information determination server apparatus 10. Operation unit 230 includes a handler such as a keyboard and a mouse, or the like, and provides an operation signal according to the user's operation to control unit 210. Storage unit 240 is a storage means such as a hard disk drive, or the like, for example, and stores data and programs that control unit 210 uses for control, and the train service information of associated train lines.

FIG. 4 is a diagram illustrating a hardware configuration of accident information determination server apparatus 10. Accident information determination server apparatus 10 includes control unit 110, communication unit 120, and storage unit 130. The hardware of these units is common to the respective units in service information delivery server apparatus 20 except for operation unit 230. Storage unit 130 stores data and programs that control unit 110 uses for control, and the train service information delivered by service information delivery server apparatus 20. Also, storage unit 130 stores a MAC address of communication apparatus 52 associated with the car number (number indicating the location of the car from the head of the train) of car 51 to which the respective communication apparatus 52 is attached, and with the train line on which car 51 runs. This information is used to specify the car and the train line on which resides mobile communication terminal 30 that communicates with accident information determination server apparatus 10 through communication apparatus 52. Also, storage unit 130 stores information that represents the location of each station of the train line associated with the respective service information delivery server apparatuses 20. This information is represented by a combination of longitude and latitude, for example.

FIG. 5 is a sequence chart illustrating a processing sequence in the processing in which accident information determination server apparatus 10 acquires the train service information (hereinafter referred to as "service information acquiring process"). In the service information acquiring process, since each service information delivery server apparatus 20 performs similar processing, only the processing performed by service information delivery server apparatus 20A is described in FIG. 5. In the following, although accident information determination server apparatus 10 and service information delivery server apparatus 20A will be described as performing the operation, the actual operation is performed by their respective control units. Accident information determination server apparatus 10 continuously performs the service information acquiring process during the time when the train line for which the accident information is accumulated is in service.

First, service information delivery server apparatus 20A produces the train service information for train line A of railroad company A that operates the server (Step S11). Service information delivery server apparatus 20A performs the processing in Step S11, due to operation unit 230 being operated by an operator that operates the server, and being input contents of the train service information. Note that service information delivery server apparatus 20A also may produce train service information based on the data transmitted from other apparatuses owned by railroad company A. Details of the train service information that service information delivery server apparatus 20A produces in this way will be described with reference to FIG. 6.

FIG. 6 is a table illustrating an example of train service information that service information delivery server apparatus 20A produces. In the table, six items, namely "train line", "service status", "section", "time of occurrence", "transmission time" and "reason", are included. These items represent items included in the train service information. Also, in the table, the various pieces of train service information are arranged in order of the "transmission time" in which the newest is on top so as to be the new train service information. In the first row of the table, "train line A" is given in "train line", "operation suspended" is given in "service status", "whole line" is given in "section", "13:05" is given in "time of occurrence", "13:08" is given in "transmission time", "personal injury" is given in "reason". That is to say, train service information is represented that indicates that a "service status" of "operation suspended" in a "section" extending over the "whole line" due to "personal injury" as the "reason" has occurred at "train line A" at "13:05" as "time of occurrence", has been transmitted at "13:08".

Similarly, in the second row of the table, train service information is represented that indicates that the change of the "section" with "operation suspended" from "whole line" to "A4 station to A8 station" has been transmitted at "13:45". And, train service information that indicates that "service status" is changed from "operation suspended" to "resume operation/off schedule" and has been transmitted at "14:33" is represented in the third row of the table, and train service information that indicates that the "off schedule" situation is over, and the "service status" is changed to "normal operation", and is transmitted at "15:30" is represented in the fourth line.

The train service information shown in rows one to three in the table of FIG. 6 is accident information, and the train service information designated in fourth row is normal information. When an accident occurs on a train line, since the railroad company responds in various ways to restore the normal operation, as shown in the example, the scale and the degree of the accident change from moment to moment. When the normal operation has been restored, by being provided the normal information, the passenger on the train is notified that the accident has been resolved.

In the example shown in FIG. 6, service information delivery server apparatus 20A produces the train service information at "13:08", "13:45", "14:33", and "15:30" listed under "transmission time". These processes to produce the train service information correspond to the processes in steps S11, S14, S17, and S21 in the sequence chart in FIG. 5. When service information delivery server apparatus 20A produces the train service information in these processes, the produced data representing train service information (train service information data) is transmitted to accident information determination server apparatus 10 (steps S12, S15, S18, and S21). The train service information data is transmitted in a format decided between railroad company A and a business operator who provides the accident information determination service, and is transmitted as csv (Comma-Separated Values), for example.

When accident information determination server apparatus 10 receives the train service information data that are transmitted in the various steps described above, it stores the train service information representing the train service information data in storage unit 130 (steps S13, S16, S19, and S22). Thus, each service information delivery server apparatus 20 delivers the train service information by transmitting the train service information data. Accident information determination server apparatus 10 secures a region to store the train service information of train line A in storage unit 130 (hereinafter referred to as "train line A region"). When the train service information of train line A is delivered, the delivered train service information is stored in train line A region. When the train service information is already stored in the train line A region, accident information determination server apparatus 10 overwrites it with the delivered train service information. Accordingly, accident information determination server apparatus 10 stores the train service information that represents the newest service status of train line A. Thus, accident information determination server apparatus 10 acquires the train service information from each service information delivery server apparatus 20. Note that instead of overwriting the train service information, accident information determination server apparatus 10 may store it associated with a date, and read out the train service information that is closest to the current time.

Next, accident information that represents various accidents occurring on the train lines will be described.

FIG. 7 is a table illustrating an example of various kinds of accident information. In FIG. 7, to make the explanation easier to understand, accident information is designated using existing train lines and station names. "Service status" lists the items "delay", which indicates that the departure of trains is delayed beyond the scheduled departure time, "operation suspended", which indicates that all trains are stopped, "direct operation suspended", which indicates that direct operation to another train line is stopped, and "limited operation", which indicates that trains run only in a limited section. If the "service status" is "delay", then a time such as "30 minutes" or "40 minutes" that indicates the degree of the "delay" is also indicated. In "section", the section where the "service status" occurs is indicated. For example, in the first row, it is indicated that on the "Chuo Line", "both upbound and downbound lines" from "Tokyo" station to "Takao" station are in "limited operation". In "time of occurrence", the time when an event that causes the "service status" occurs is indicated. The event is indicated as the "reason", and in the example, events such as "personal injury", "lightning strike", "snow", and "train malfunction" are indicated. Also, when the "service status" is "direct operation suspended", indicating that an accident has occurred on a train line, to which the train tracks are connected and trains are directly operated, the train line name is also indicated. In the example, as the "reason" of accident information of "Chiyoda Line", "lightning strike" on "Odakyu Line", which is a train line to which "Chiyoda Line" performs direct operation, is indicated.

Accident information determination server apparatus 10 determines how large the effect of such accident information on the passenger of the train is.

FIG. 8 is a sequence chart that shows a sequence of processing that determines an impact of the accident represented by the accident information (accident information determination processing) performed by accident information determination server apparatus 10. In FIG. 8, although accident information determination server apparatus 10 and mobile communication terminal 30 will be described as performing the operation, the actual operation is performed by their respective control units. Accident information determination server apparatus 10 performs the accident information determination processing when a passenger who is on board on N-th car 51 of train 50 shown in FIG. 1 performs an operation using mobile communication terminal 30 to request to be notified of the result of determining the accident represented by the accident information, as a trigger.

In storage unit 350 of mobile communication terminal 30, a program to make this request to accident information determination server apparatus 10 is stored. Mobile communication terminal 30, first, acquires a MAC address of communication apparatus 52 with which first communication unit 320 communicates (Step S31) by activating the program with the passenger operating operation unit 330. Next, mobile communication terminal 30 acquires the positioning information using positioning unit 360 (Step S32). And, mobile communication terminal 30 transmits requesting data that indicates the request to accident information determination server apparatus 10 along with the data that indicates the acquired MAC address and the positioning information (Step S33). These data are transmitted to accident information determination server apparatus 10 through communication apparatus 52 provided at N-th car 51, as shown in FIG. 1. Next, mobile communication terminal 30 again acquires the positioning information using positioning unit 360 (Step S34), and transmits the data that indicates the acquired positioning information to accident information determination server apparatus 10 (Step S35). As described above, mobile communication terminal 30 makes the above request along with notifying the positioning information and the MAC address to accident information determination server apparatus 10.

Having received the request made in step S33, accident information determination server apparatus 10 specifies the train line, the terminal location, the moving direction, and the car number on which mobile communication terminal 30 that has made the request resides, using the positioning information and the MAC address notified in steps S33 and S35 (step S36). Here, "terminal location" refers to the location of the mobile communication terminal that the passenger on the train running on the train line possesses, that is, mobile communication terminal 30 in this case, on the train line. When the train is running, the terminal location indicates between what station and what station it is, and when the train is stopping it indicates at what station it is stopping. The terminal location is a location that is determined in an absolute manner regardless of the train line or the car on which mobile communication terminal 30 resides. Accident information determination server apparatus 10, specifically, references storage unit 130 and specifies the car number of car 51 that is associated with the transmitted MAC address, and the train line on which car 51 runs. In this example, accident information determination server apparatus 10 specifies the car number as "N" and the train line as "train line A".

Next, accident information determination server apparatus 10 references storage unit 130 and specifies the terminal location on which mobile communication terminal 30 resides from the relationship between the location that is represented by the data transmitted in steps S33 and S35, and the location of the individual stations on specified "train line A". More specifically, accident information determination server apparatus 10 specifies that if the distance between the location represented by the data and the location of any of the stations on "train line A" is equal to or less than a threshold value (50 m, for example), the terminal location is that station, and if not, it determines the two stations on "train line A" whose distances to the location represented by the data are shortest, and specifies that the terminal location is between those two stations.

Also, accident information determination server apparatus 10 specifies the direction that points from the location represented by the data transmitted in Step S33 toward the location represented by the data transmitted in Step S35 as the moving direction. The moving direction is either the "upbound direction" or the "downbound direction" on the train line. Note that accident information determination server apparatus 10 may specify either of the terminal location and the moving direction earlier.

Then, accident information determination server apparatus 10 determines how much the accident information affects the passenger (Step S37) using the specified train line, the terminal location, the moving direction, and the car number. More specifically, accident information determination server apparatus 10 determines how large the effect is based on the likelihood that the passenger who is moving on the specified train line at the specified terminal location in the specified moving direction (that is, the passenger who made the request) transfers to the train line on which the accident has occurred, and the time loss to be suffered from the accident if the passenger uses the train line on which the accident has occurred. Hereinafter, the passenger who made the request is referred to as "requester". Accident information determination server apparatus 10 defines these possibilities and the size of the loss as a score in the following five ways, and determines that the higher the total score obtained by summing up these scores, the more the accident that is represented by the accident information on the train line affects the requester.

First, accident information determination server apparatus 10 specifies the number of times the requester needs to transfer trains on the train line route having the lowest number of transfers needed to reach a station at which the requester can change train lines, that is, the station at which more than one train line is passing (hereinafter referred to as "transfer station"), and the distance along that train line route. Then, accident information determination server apparatus 10 calculates the score with a method in which the lower the specified number and the shorter the distance, the higher the score of the accident that has occurred on the train line that is the destination of the transfer when the requester reaches the transfer station on the train line route (hereinafter referred to as "first method"). Here, "train line route" refers to a route to reach a given station (in this case, the transfer station) from a given location, and is represented, for example, by the train lines and the stations to change train lines when traveling to the station on the route. In the following, the score calculated by the first method is referred to as "first score". The higher the first score, the smaller the number of transfers to the transfer station, and the shorter the distance, which represents that the likelihood for the requester to change train lines at the transfer station is high. That is to say, the higher the calculated first score, the higher the likelihood that the accident affects the requester. In other words, such an accident has a larger influence on the requester than an accident with a smaller calculated first score. In the following, a specific example will be described with reference to FIG. 9.

Figure 9:
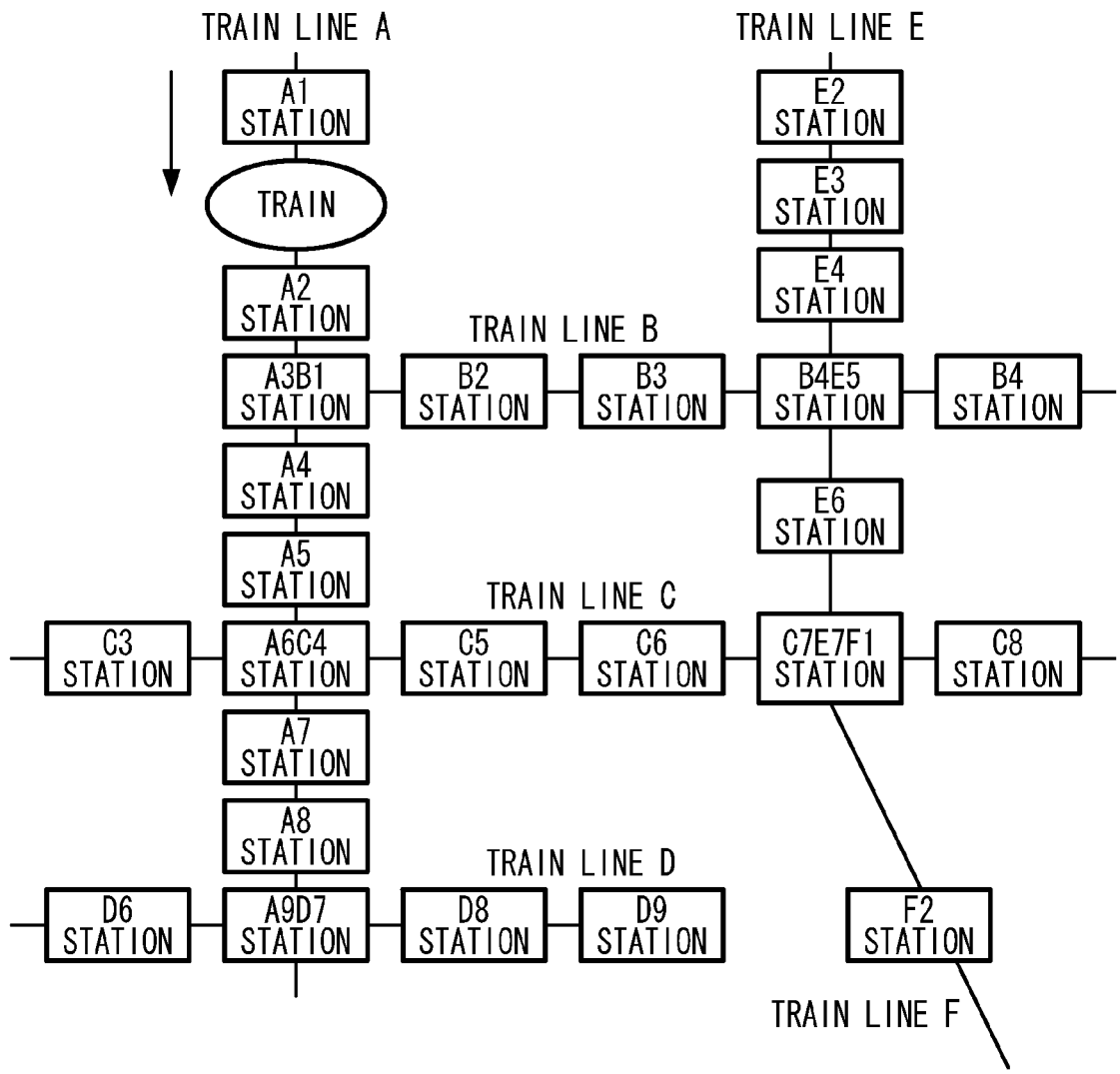
FIG. 9 is a diagram illustrating relations between the various stations on six train lines and transfers between respective train lines.

FIG. 9 is a diagram illustrating the relationship between the various stations on six train lines from train line A to train line F and transfers between the train lines. Stations on the train lines are given names that are combinations of the train line name and a number, and the number successively increases from the starting station located at the most upbound location of each train line toward the stations in the downbound direction. For the transfer stations, the name of the train line to which the transfer is possible is combined. For example, in "train line A", names are given as follows: "A1 station" is for the starting station, and in the downbound direction, "A2 station", "A3B1 station" (the station is also the starting station of the "train line B"), "A4 station", "A5 station", "A6C4 station" (the station is also the fourth station on the "train line C" from the starting station in the downbound direction), "A7 station", "A8 station", "A9D7 station" (the station is also the seventh station on the "train line D" from the starting station in the downbound direction). In step S36 in FIG. 8, as shown by "train" in FIG. 9, it is specified that the train line is "train line A", the terminal location is at the center between "A1 station" and "A2 station", and the moving direction is "downbound direction". In FIG. 9, to make the explanation easier to understand, except for the distances between A1 station and A2 station and between stations on train line F, the distance between stations along the train line (hereinafter referred to as "train line distance") is taken to be the same, and the train line distance of a one-station section (until the next station) is represented as one station. Only the train line distance between A1 station and A2 station is taken to be two stations. For example, the train line distance from "train" to "A3B1 station" in FIG. 9 is represented as two stations.

In FIG. 9, six transfer stations, "A3B1 station", "A6C4 station", "A9D7 station", "B4E5 station", and "C7E7F1 station" are indicated. In the following, the sum of train line distances along the shortest train line route from the terminal location specified in step S36 to these transfer stations (hereinafter referred to as "shortest train line route distance") will be represented by the number of one-station sections (train line distance to the next station) that pass until the station. For "A3B1 station", the shortest train line route distance is two stations and the number of transfers is 0 times. Respective shortest train line route distances are as follows: five stations and 0 transfers for "A6C4 station", eight stations and 0 transfers for "A9D7 station", five stations and one transfer for "B4E5 station", for "C7E7F1 station" seven stations and three transfers via "B4E5 station", and eight stations and two transfers via "A6C4 station". Accident information determination server apparatus 10 calculates the first score using the following equation (1):

$$\text{first score} = X / \text{"shortest train line route distance"} \times Y / (\text{"number of transfers"} + 1) \quad (1)$$

In the present embodiment, X=10 and Y=1 is set. For example, for "A3B1 station", first score=10/2×1/(0+1)="5". In the similar way, the first scores for "A6C4 station", "A9D7 station", and "B4E5 station" are "2", "1.25", and "1". For "C7E7F1 station", two first scores, "0.357" via "B4E5 station", and "0.417" via "A6C4 station" are calculated (rounded off to three decimal places). Note that X and Y may have other values, and may be set to be the larger, the larger the degree to change the size of the influence by the shortest train line route distance or the number of transfers.

These first scores, as described above, will be the first score of the train line to be transferred to when the requester is considered to transfer at the transfer station. That is, at "A3B1 station", since the requester changes to "train line B", the first score of "train line B" will be "5". In the similar way, the first scores of "A6C4 station", "A9D7 station", and "B4E5 station" are the first scores for "train line C", "train line D", and "train line E", respectively. Since the first score "0.357" for "C7E7F1 station" is the first score when arriving via "B4E5 station", the destination of transfer in this case is "train line C" or "train line F". However, since the first score of "2" for "A6C4 station" is calculated for "train line C", in this case, accident information determination server apparatus 10 determines the larger value ("2") as the first score for "train line C". The same is applied to the first score of "0.417" for "C7E7F1 station", and for "train line E", which is the destination of transfer, accident information determination server apparatus 10 determines "1" for "B4E5 station", which is larger, as the first score for "train line E". For "train line F", although two first scores, "0.357" and "0.417" for "C7E7F1 station" are calculated, accident information determination server apparatus 10 also determines "0.417", which is the larger, as the first score for "train line F". Thus the first scores calculated by the first method will be as follows: "train line B (5)">"train line C (2)">"train line D (1.25)">"train line E (1)">"train line F (0.417)". By adding the first score to the total score, accident information determination server apparatus 10 determines that the higher the first score for the train line, that is the lower the number of transfer, and the shorter the shortest train line route distance, as described above, the larger the influence on the requester of the accident occurred on the train line.

Next, a second method will be described. In the second method, accident information determination server apparatus 10 stores in storage unit 130 a score (hereinafter referred to as "second score") that is determined based on the time loss the passenger suffers when the passenger uses the train line on which an accident has occurred. The second score represents the time loss described here, and is determined in advance by the provider of the accident information determination service. The second score is determined, for example, to be higher for a train line that moves a longer distance, to be higher for a train line that moves longer distance per unit time, or to be higher for a train line in which train line distance of one station section is longer, relative to other train lines. For example, the Shinkansen and the Narita Express have a higher second score than the Yamanote Line or subway Ginza Line. If the second score is determined in this way, when an accident occurs on a train line with a higher second score, since a passenger cannot move a long distance even though the passenger desires to move a long distance, even if the passenger takes alternative measures, the time required for the movement becomes longer than in the case where an accident occurs on a train line with a smaller second score. That is to say, the higher the second score of a train line, the greater the time loss when an accident occurs on the train line relative to a train line with smaller second score.

In the example in FIG. 9, the train line distance between stations on "train line F" corresponds to five stations as described above. In this case, for example, the second scores of accident information for the train lines A to E are determined to be "1", and the second score of accident information for the train line F is determined to be "5". Then accident information determination server apparatus 10 calculates the second score of the accident information that has occurred on the train line A to E to be 1, and the second score of the accident information that has occurred on the train line F to be 5. Thus, accident information determination server apparatus 10, by adding the second score to the total score, specifies the second score determined for the train line on which the accident represented by the accident information has occurred, that is the time loss for the train line, and determines that the larger the specified loss, the larger the influence of the accident on the requester.

Next, a third method will be described. In the third method, accident information determination server apparatus 10 determines a value based on the content of "service status" represented by the accident information as the score of the accident information (hereinafter referred to as "third score"). The third score is determined by the provider of the accident information determination service in advance. For example, when "service status" is "delay", accident information determination server apparatus 10 calculates the third score to be 3 if the delay time is less than 30 minutes, to be 5 if at least 30 minutes and less than one hour, to be 7 if at least one hour and less than two hours, and to be 10 if at least two hours. When "service status" is "operation suspended", accident information determination server apparatus 10 calculates the third score to be 10. Similarly, when "service status" is "direct operation suspended" and "limited operation", accident information determination server apparatus 10 calculates the third score to be 4, because many trains are not operated on schedule.

If the third score is determined as described above, when a passenger needs to take a train line on which an accident with a higher third score has occurred, the time loss becomes more relative to taking a train line on which an accident with a smaller third score has occurred. Thus, by adding the third score to the total score, accident information determination server apparatus 10 determines that the larger the time loss when the accident affects the requester, the larger the influence on the requester.

Next, a fourth method will be described. Accident information determination server apparatus 10 stores, in storage unit 130, transfer stations, first train lines that are passing the transfer stations, second train lines that are possible to be transferred from the first train lines at the transfer stations, associated with the car position (hereinafter referred to as "first car position") of the train on the first train line that is stopping at the transfer station that requires shortest time to transfer. The first car position is represented by the car number. Storage unit 130 in this case functions as a "first storage means" in the present invention. Accident information determination server apparatus 10, using the train line, the terminal location, the moving direction, and the car number specified in step S36 in FIG. 8, when the specified train line is the first train line, if the difference between the first car position stored in storage unit 130 associated with the transfer station where the train on the first train line stops, and the car position represented by the specified car number (hereinafter referred to as "second car position") is in a predetermined range, calculates the score (hereinafter referred to as "fourth score") to be 5 of the accident that has occurred on the second train line stored in storage unit 130 associated with the first train line and the first car position.

Here, the range is a range determined by the provider of the accident information determination service, and if it is "1", for example, even if the mobile communication terminal 30 is in a car next to the first car position, the fourth score is calculated to be "5". When the difference is beyond the range, accident information determination server apparatus 10 calculates the fourth score to be 0. These first car position and the second car position are, different from the terminal location described above that is determined in an absolute manner, positions determined relative to the associated car. For example, for a train with 10 cars, it is represented by the car number from 1 to 10, and for a train with 15 cars, it is represented by the car number from 1 to 15.

A passenger on the car in the first car position, or on a car within a predetermined region from the car has a higher likelihood to transfer to the second train line at the transfer station associated with the first car position, relative to a passenger on other cars. By adding the fourth score to the total score, accident information determination server apparatus 10 determines that, if the difference between the second car position specified on the train on the first train line (specified train line, in this case), and the first car position stored in storage unit 130 associated with the first train line is in that range, the larger the influence is on the requester, who is on the car in the second car position, by an accident that has occurred on the second train line stored in storage unit 130 associated with the first train line and the first car position, relative to the case in which the difference is beyond the range.

Next, a fifth method will be described. Accident information determination server apparatus 10 stores in storage unit 130 sections on respective train lines associated with a number of passengers in the respective sections at each time slot. Storage unit 130 in this case functions as a "second storage means" in the present invention. Here the section is a section such as Tokyo-Yokohama, Yokohama-Odawara, or Odawara-Atami in case of the Tokaido Line, and is determined by the provider of the accident information determination service in advance. The provider determines, for example, sections in which the number of passengers in each time slot are similar to be one section. Here, the time slot is, for example, a time slot of one hour as the unit, such as 9 o'clock to 10 o'clock, or 10 o'clock to 11 o'clock. Moreover, accident information determination server apparatus 10 stores the time required between stations on respective train lines.

Accident information determination server apparatus 10 specifies first, using the train line, the terminal location, and the moving direction specified in step S36 in FIG. 8, and the time required stored in storage unit 130, the time at which the requester is estimated to make a transfer, if the requester who is moving from the specified terminal location in the specified moving direction transfers the train line at the transfer station. Then accident information determination server apparatus 10 refers to the number of passengers who use the train line corresponding to the time slot including the specified time, among the number of passengers stored in storage unit 130 associated with the section including the transfer station on the train line to be transferred. Accident information determination server apparatus 10 calculates a score (hereinafter referred to as "fifth score") based on the number of referred passengers who use the train line. Accident information determination server apparatus 10 determines that the fifth score is 10 if the referred number of passengers who use the train lines is at least 20,000. Accident information determination server apparatus 10 determines the fifth score to be 5, if the number of passengers is at least 10,000 and less than 20,000, and in the similar manner, to be 3 if it is at least 5,000 and less than 10,000, to be 2 if it is at least 2,000 and less than 5,000, and to be 1 if it is at least 1,000 and less than 2,000.

As described above, by adding the fifth score to the total score, accident information determination server apparatus 10 may determine the influence exerted on the requester by an accident that has occurred on the train line changing the size of influence in a time slot in which the number of passengers is large from the influence in a time slot in which the number of passengers is small, even on the same train line. Specifically, a large number of passengers means that the likelihood to be transferred is high relative to other train lines. Accident information determination server apparatus 10 references the number of passengers corresponding to the time slot including the specified time, and determines that the larger the referred number of passengers, the larger the influence on the passenger by an accident that has occurred on the train line to be transferred.

Accident information determination server apparatus 10 determines the five scores by the five methods described above, and calculates the total score by adding the scores. In the example in FIG. 9, for example, let us assume that accident have occurred on train lines B, D, E, and F, and respective pieces of accident information are stored in storage unit 130 of accident information determination server apparatus 10. Then, let us assume that accident information determination server apparatus 10 has calculated in step S37 that the total score of the respective pieces of accident information that have occurred on the train lines B, D, E, and F satisfies the following relationship: train line B>F>E>D. Thus, accident information determination server apparatus 10 determines that the accident information of train line B affects the requester the most, followed by train line F, and train line E. The accident information of train line D is determined to affect the requester the least. Accident information determination server apparatus 10 transmits the data indicating the decision result, that is, respective pieces of accident information and the associated total scores calculated on respective pieces of accident information, and the data specified in step S36 indicating "train line", "terminal location", and "moving direction" to mobile communication terminal 30 (step S38). As described above, accident information determination server apparatus 10 performs the accident information decision processing and notifies the result to mobile communication terminal 30.

Mobile communication terminal 30 displays the accident information indicated by the data that is transmitted in step S38 on display unit 340 in the order of the total scores associated to the accident information indicated by the data (step S39).

FIG. 10 is a diagram illustrating an example of an image displayed on display unit 340 in step S39. In this example, based on "train line", "terminal location", and "moving direction" indicated by the data that is transmitted in step S38, mobile communication terminal 30 displays a character string indicating that the train on which the requester rides is "on the way from A1 station to A2 station" on "train line A". Moreover, mobile communication terminal 30 displays, as the determined result described above, character strings indicating "train line", "service status", "section", "time of occurrence", and "reason" among pieces of accident information of respective train lines. Moreover, mobile communication terminal 30 displays the accident information in the order of train lines B, F, E, and D from the top of the image. The requester can understand by looking at the image that, among the accidents represented by pieces of accident information, the accident on train line B displayed at the top affects the requester the most, and the influence on the requester decreases in the order of accidents of train line F, E, and D. By performing the above processing, mobile communication terminal 30 transmits information to the requester that represents the result that the accident represented by the accident information is determined by accident information determination server apparatus 10. Thus, accident information determination server apparatus 10 enables the requester to understand how much the influence of the accident that has occurred on the train line affects the requester.

In the five methods described above, although the train line, the terminal location, the moving direction, and the car number specified in step S36 are used, information registered in advance such as the train line the requester is planning to use is not used. Thus, even if the train line that the passenger is planning to use is not registered in advance, accident information determination server apparatus 10 enables the passenger to understand how much the accident that has occurred on the train line affects the passenger.

Figure 11:
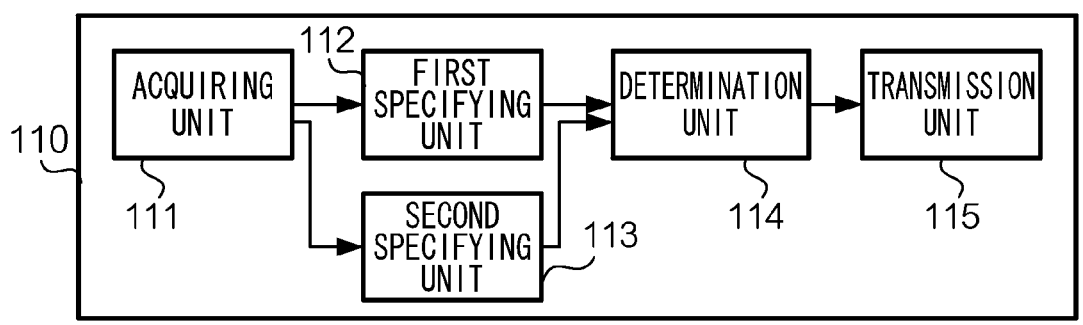
FIG. 11 is a block diagram illustrating a function of a control unit of the accident information determination server apparatus.

FIG. 11 is a block diagram illustrating functions realized by control unit 110 of accident information determination server apparatus 10 executing a program. Control unit 110 functions as acquiring unit 111, first specifying unit 112, second specifying unit 113, determination unit 114, and transmission unit 115. By executing processing to store and overwrite train service information shown in steps S13, S16, S19, and S22 in FIG. 5, acquiring unit 111 functions as an acquiring means to acquire accident information representing an accident on respective train lines that have occurred during the operation of the trains in the transport network including plural train lines on which trains run. Acquiring unit 111 supplies the data representing the acquired accident information to first specifying unit 112 and second specifying unit 113. By executing processing to specify the terminal location and the moving direction shown in step S36 in FIG. 8, first specifying unit 112 functions as a first specifying means to specify the terminal location that is the location of mobile communication terminal 30 held by the passenger on a train running on one of the train lines, and the moving direction of mobile communication terminal 30 on the train line. That is to say, the passenger is the requester described above. First specifying unit 112 supplies the data representing the specified terminal location and the moving direction to determination unit 114. By executing processing to specify the car number shown in step S36 in FIG. 8, second specifying unit 113 functions as a second specifying means to specify the position of the car in the train on which mobile communication terminal 30 resides. First specifying unit 112 supplies the data representing the specified car number to determination unit 114.

By executing processing shown in step S37 in FIG. 8, determination unit 114 functions as a determination means that determines how large the influence of the accident represented by the accident information acquired by acquiring unit 111 is on a passenger who moves from the terminal location specified by first specifying unit 112 in the specified moving direction. The specific determination method by determination unit 114 is the same as that described in step S37. Determination unit 114 supplies the determined result to transmission unit 115. By executing processing shown in step S38 in FIG. 8, transmission unit 115 functions as a transmission means that associates the accident information acquired by acquiring unit 111 with the impact information representing the impact determined on the accident information by determination unit 114, and transmits them to mobile communication terminal 30.

2. Second Embodiment

An accident information determination system that relates to a second embodiment of the present invention has a configuration in common with accident information decision system 1 of the first embodiment described above. Thus, for structures that are the same as in the first embodiment, explanations will be omitted as appropriate by providing the same reference signs. The main difference between the first embodiment and the present embodiment is that, although accident information determination server apparatus 10 transmits accident information and impact information associated therewith that is the result of determining an accident to mobile communication terminal 30 in the first embodiment, in the present embodiment the information is transmitted to an on-board display that has a communication function provided at each car of the train.

FIG. 12 is a block diagram illustrating an overall configuration of accident information decision system 1a according to the present embodiment. Accident information decision system 1 includes on-board displays 30a provided at each car 51a of train 50a including multiple cars running on train line A. On-board display 30a has a wireless communication function and communicates with accident information determination server apparatus 10 through network 40. Thus, on-board display 30a is a communication terminal that performs wireless communication moving along with car 51a. On-board display 30a transmits to the passengers who are on car 51a that is provided with the display the information representing the result determined by accident information determination server apparatus 10 how large the influence of the accident represented by the accident information is on the passengers.

Figure 13:
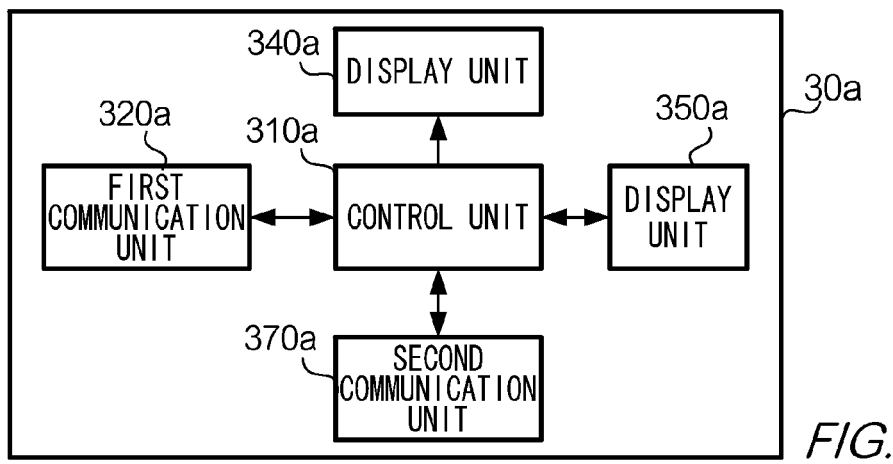
FIG. 13 is a diagram illustrating a hardware configuration of an on-board display.

FIG. 13 is a diagram illustrating a hardware configuration of on-board display 30a. On-board display 30a is a computer that includes control unit 310a, first communication unit 320a, display unit 340a, and storage unit 350a. Although the processing capability and the storage capacity are different from control unit 310 and storage unit 350 of mobile communication terminal 30 described above, control unit 310a and storage unit 350a has the same hardware configurations and functions. First communication unit 320a includes a communication circuit that transmits to and receives signals from network 40, and communicates with accident information determination server apparatus 10 through network 40. Display unit 340a is a display means that includes a liquid crystal panel and an LCD driver, is attached in a position where it can be easily viewed by the passengers on train 51a, and displays images on the display screen of the liquid crystal panel in response to instructions from control unit 310. Second communication unit 370a includes a communication circuit that transmits to and receives signals from a control system that controls operation of train 50a shown in FIG. 1. The control system holds the location of train 50a on a train line on which train 50a runs (hereinafter referred to as "train location"), and the moving direction.

Figure 14:
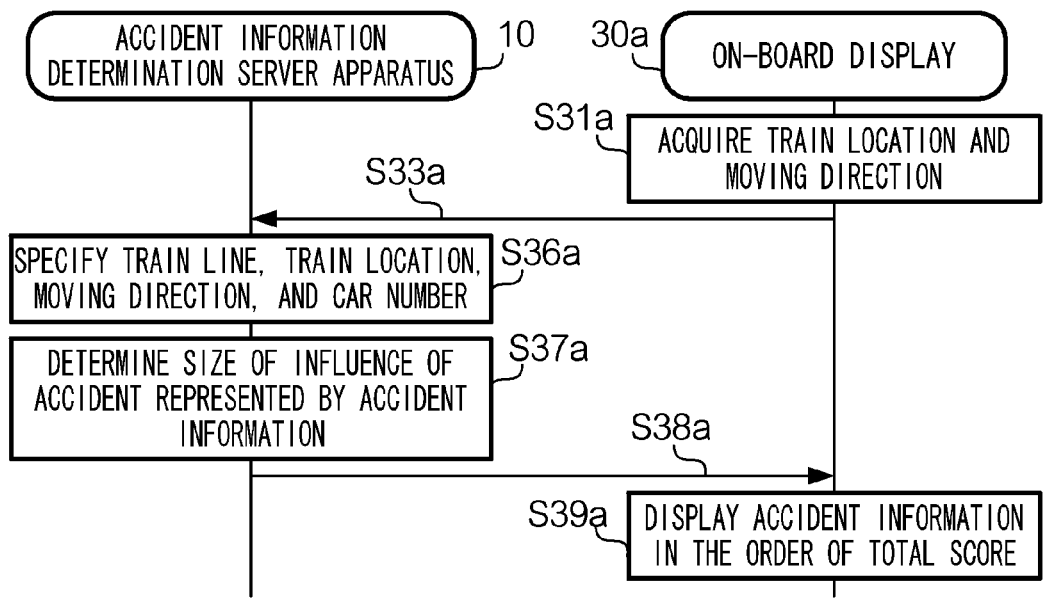
FIG. 14 is a sequence chart illustrating a procedure of accident information determination processing.

FIG. 14 is a sequence chart illustrating a procedure of accident information determination processing according to the present embodiment. In FIG. 14, although accident information determination server apparatus 10 and on-board display 30a will be described to perform the operation, the actual operation is performed by the respective control units. On-board display 30a acquires and displays data representing weather or news of the day by communicating with predetermined server apparatus through network 40, and also displays accident information at predetermined intervals. In order to display the accident information, on-board display 30a performs an operation that requests accident information determination server apparatus 10 to send the results of determining an accident represented by accident information as follows.

Storage unit 350a of on-board display 30a stores the train line on which train 50a that is provided with its on-board display 30a runs, and the car number of car 51a of train 50a on which on-board display 30a is provided. First, on-board display 30a communicates with the control system and acquires the train location of train 50a described above and the moving direction (step S31a). Next, on-board display 30a transmits requesting data that represents the above request to accident information determination server apparatus 10, along with the data indicating the train location and the moving direction acquired in step S31a and the data indicating the train line ("train line A", in this case) and the car number ("N", in this case) stored in storage unit 350a. In this way, on-board display 30a makes above request.

When receiving the requesting data transmitted in step S33a, accident information determination server apparatus 10 specifies pieces of information that the data sent along therewith represents as the train line, the train location, the moving direction, and the car number on which on-board display 30a that made request resides (step S36a). Then, accident information determination server apparatus 10 performs processing shown in step S37 in FIG. 8 using the train location instead of the terminal location, and determines how much the influence of the accident information affects the passengers on N-th car 51a (step S37a). Accident information determination server apparatus 10 transmits the result determined in step S37a, that is the data indicating the accident information and the impact information associated therewith to on-board display 30a (step S38a).

On-board display 30a displays the accident information indicated by the data that is transmitted in step S38a on display unit 340a in the order of the total score associated with respective pieces of accident information indicated by the data (step S39a). By performing the above processing, on-board display 30a conveys the information to the passengers on the car on which the display is provided, which represents the result determined by accident information determination server apparatus 10 on the accident represented by the accident information. Thus, accident information determination server apparatus 10 enables the passengers to understand how much the influence the accidents that have occurred on train lines affects the passengers.

3. Modifications

The embodiments described above are only examples of embodiments of the present invention, and may be modified as follows. Also, respective embodiments described above and respective modifications described below may be combined as necessary.

3-1. Modification 1

The processing performed by control unit 110 of accident information determination server apparatus 10 in the embodiments described above may be performed by control unit 310 of mobile communication terminal 30, or control unit 310a of on-board display 30a. In the following, a case where the processing is performed by control unit 310 will be described. In this case, storage unit 350 of mobile communication terminal 30 stores the data that is stored in storage unit 130 of accident information determination server apparatus 10.

Figure 15:
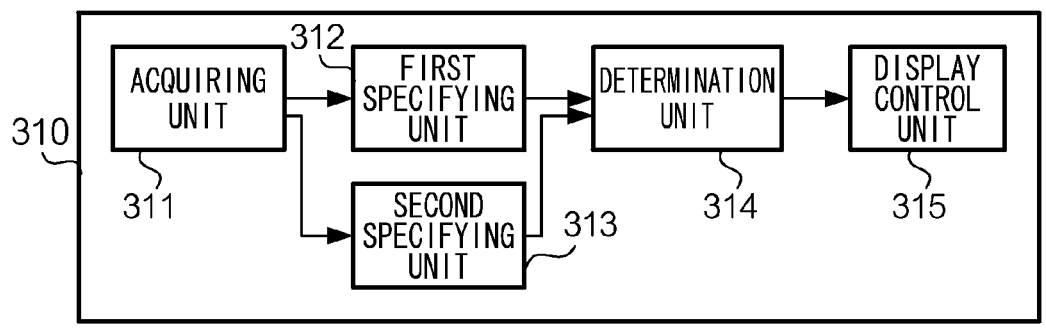
FIG. 15 is a block diagram illustrating a function of a control unit of the mobile communication terminal.

FIG. 15 is a block diagram illustrating a function realized by executing programs with the control unit 310 according to the modification. Control unit 310 functions as acquiring unit 311, first specifying unit 312, second specifying unit 313, determination unit 314, and display control unit 315. Acquiring unit 311, first specifying unit 312, second specifying unit 313, and determination unit 314 are the same as acquiring unit 111, first specifying unit 112, second specifying unit 113, and determination unit 114 shown in FIG. 11, respectively, except that the processing performed on "mobile communication terminal 30" is performed on "its own terminal". For example, first specifying unit 312 specifies the terminal location that is the location of its associated terminal on the train line, and the moving direction of its own terminal on the train line. Similarly, determination unit 314 determines how much the influence of the accident indicated by the accident information affects the passengers on the car on which its associated terminal resides that moves from the terminal location specified by first specifying unit 312 in the moving direction specified similarly. Determination unit 314 supplies the determined result to display control unit 315. Display control unit 315 displays the accident information on display unit 340 in a manner corresponding to the size of the influence determined on the accident information. Display control unit 315 and display unit 340, by working together, function as "display means".

3-2. Modification 2

Equation (1) used in the first method, and the scores predetermined respectively in the second method to the fifth method, in the embodiments described above, are only an example, and there is no limitation to the equation and values described above. In short, these equation and values may be determined so that when the degree of contribution of a factor associated with the respective methods on the size of the influence described above is desired to be large, the score determined by the method becomes larger. Here, "factor" refers to the distance from the train on which the requester rides and the number of transfers, in the first method, and the importance of respective train lines, in the second method. Similarly, in the third, fourth, and fifth method, the factors are the content of the service status, the ride to the car from which the distance of movement for the transfer is the shortest, and the number of passengers in each of the train lines, respectively.

3-3. Modification 3

Control unit 110 of accident information determination server apparatus 10 may determine a score with a method other than the five methods described above, and add it to the total score. For example, control unit 110 may change the score based on the number of passengers corresponding to the moving direction of the train and the time slot in each of the sections described above. In this case, the sections of each of the train lines associated with the number of passengers corresponding to the moving direction of the train and the time slot in each of the sections are stored in storage unit 130 of accident information determination server apparatus 10. Storage unit 130 in this case functions as a "third storage means" according to the present invention. First, control unit 110 specifies the sections included in the shortest train line route on which the requester moves from the specified terminal location in step S36 in the moving direction specified similarly to reach the transfer station, and the estimated time when the requester uses the section if the requester moves on the train line route. Next, control unit 110 performs processing that calculates a value that is the number of passengers corresponding to the moving direction in the section and the specified time when the requester moves on the train line route, among the number of passengers stored in storage unit 130 associated with the specified section, divided by the distance of the part that is included in the train line route among the section. Then control unit 110 performs the processing on each of the sections included in the train line route, and calculates the sum of the calculated values as the score (hereinafter referred to as "sixth score").

The greater the number of passengers is on the section of the train line included in the train line route at the time slot used by the requester, the higher the likelihood that the requester moves on the train line route. That is to say, control unit 110 determines that the higher the sixth score, the larger the influence of the accident on the requester, which has occurred on the train line to which the requester transfers at the transfer station when the requester moves on the train line route.

Also, control unit 110 may calculate the score, for example, to be the higher, the later the time when the accident is estimated to be resolved relative to the time when the requester is estimated to use the train line on which the accident occurs. Hereinafter the score calculated in this manner is referred to as "seventh score". In this case, storage unit 130 stores the reason for which an accident occurs associated with the required time for the accident caused by the reason to be resolved. Storage unit 130, in this case, functions as a "fourth storage means" according to the present invention. Storage unit 130 stores the reasons associated with the times such as three hours for "personal injury" and 30 minutes for "car inspection". First, control unit 110 specifies the time to reach the transfer station (hereinafter referred to as "first time") when the requester moves from the specified terminal location in step S36 in the moving direction specified similarly on the shortest train line route to the transfer station. Next, control unit 110 specifies the time (hereinafter referred to as "second time") when the time stored in storage unit 130 associated with the reason included in the accident information has passed from the time of occurrence included in the accident information. Then control unit 110 calculate a seventh score, if the second time is later than the specified first time, based on the time difference of these times. Specifically, control unit 110 calculates the seventh score to be 3 if the difference is less than 30 minutes, and in the similar manner, to be 5 if the difference is at least 30 minutes and less than one hour, to be 7 if the difference is at least 1 hour and less than 2 hours, to be 10 if the difference is at least 2 hours.

When the requester arrives at the transfer station to transfer to the train line, that is the first time, if it is before the second time, the requester is estimated to be kept waiting until the second time when the requester uses the train line. When the second time is later than the specified first time, control unit 110 determines that the larger the time difference between the first time and the second time, the larger the influence on the requester of the accident that has occurred on the train line to which transfer is available at the transfer station when the requester moves on the train line route.

3-4. Modification 4

Control unit 110 of accident information determination server apparatus 10 may calculate a score using the number of transfers the requester makes to change trains who moves on the train line route specified by the first method described above, and a separate score using the shortest train line route distance. The score calculated using the number of times is referred to as an eighth score, and the score calculated using the distance is referred to as a ninth score. Control unit 110 calculates these scores using the following equations (2) and (3), respectively:

$$\text{eighth score} = Y/(\text{"number of transfers"}+1) \quad (2)$$

$$\text{ninth score} = X/\text{"shortest train line route distance"} \quad (3)$$

X and Y used here may be the same as those used in equation (1) (X=10, Y=1), or may be other values. Control unit 110 can, by adding these scores to the total score instead of the first score described above, adjust the degree by which the size of the influence is increased or decreased by the number of transfer and the shortest train line route distance, separately. For example, by setting X=0, regardless of the number of transfers, the size of the influence cannot be increased or decreased, and by setting Y=0, regardless of the length of the shortest train line route distance, the size of the influence cannot be increased or decreased.

3-5. Modification 5

In the first embodiment described above, control unit 310 of mobile communication terminal 30 may notify the train line, the terminal location, the moving direction, and the car number that has been input by the requester by operating the operation unit 330. In the present modification, the requester can be provided the accident information determination service even when riding on a car to which no communication apparatus 52 is provided, or using a mobile communication terminal that is not provided with positioning unit 360.

3-6. Modification 6

In the first embodiment described above, it is also possible that control unit 310 of mobile communication terminal 30 communicates with accident information determination server apparatus 10 not through communication apparatus 52. In this case, mobile communication terminal 30 includes second communication unit 370 indicated by broken lines in FIG. 3. Second communication unit 370 includes a communication circuit that transmits to or receives signals from network 40, and communicates with control unit 110 through network 40. Control unit 110 specifies the train line on which mobile communication terminal 30 resides, the terminal location, and the moving direction based on the positioning information transmitted from mobile communication terminal 30, for example. Then, control unit 110 calculates the sum of scores determined by the first, second, third, and fifth method as the total score. Even in the case, control unit 110 may have the factors associated with these methods to contribute on the size of the influence.

3-7. Modification 7

In the first embodiment described above, it is also possible that control unit 110 of accident information determination server apparatus 10 performs accident information determination processing, even when mobile communication terminal 30 does not reside on train 50, by a request from mobile communication terminal 30. The situation for which this kind of usage is envisaged is, for example, when the passenger who holds mobile communication terminal 30 is on a platform at a station or on a passage for a transfer. That is to say, as the passenger, not only the person riding on a train, but also a person who is about to get on a train, and a person who got off a train and is about to transfer to the next train, for example, are included. Also, the moving direction, when the passenger does not ride on a train, is the moving direction of the train line, and represents the moving direction of the train that the passenger is about to get on.

In this case, control unit 110 stores information representing locations of the upbound platform and the downbound platform of stations in train lines in storage unit 130, and specifies that mobile communication terminal 30 resides on which station, which of upbound or downbound platform of which train line, from the location indicated by the positioning information transmitted from mobile communication terminal 30. Control unit 110 specifies that, in this time, the moving direction is upbound if mobile communication terminal 30 resides on an upbound platform, and the moving direction is downbound if it resides on a downbound platform. Similarly, when the platform of the destination of transfer can be specified to be on which train line and whether the upbound or the downbound, from the location that resides mobile communication terminal 30 held by the passenger who is changing train lines, by specifying these, control unit 110 specifies the train line, the terminal location, and the moving direction. When control unit 110 cannot specify these, as shown in Modification 5, for example, the train line, the terminal location, the moving direction, and the car number that the requester inputs by operating operation unit 330 of mobile communication terminal 30 may be used. According to the present modification, for a passenger who uses one of the train lines, control unit 110 can provide accident information determination service to the passenger by the request from mobile communication terminal 30, even when the passenger is not riding a car.

Note that, in the second embodiment described above, a display which has a hardware configuration and a function similar to on-board display 30*a* may be provided at a platform or a waiting room of a station, for example. The moving direction in this case is the moving direction of the train that the passenger who is conveyed the information by the display is estimated to get on. For example, if the location where the display is installed is on the upbound platform, the moving direction is upbound. If the location where the display is installed is on a platform for both upbound and downbound, control unit 110 specifies moving directions for both upbound and downbound in step S36*a* in FIG. 14, for example, and may determine on both the moving directions in step S37*a*. Then, control unit 310*a* of on-board display 30*a* may display both the determined results at the same time, or sequentially, in step S39*a*. Thus, control unit 110 can provide the accident information determination service to the passengers waiting for trains in these locations.

3-8. Modification 8

Although in the embodiments described above, control unit 110 of accident information determination server apparatus 10, specifies the train line, the terminal location, the moving direction, and the car number in the processing in step S36, the train line, the terminal location, and the moving direction but not the car number may be specified. In this case, control unit 110 calculates the total score by adding scores other than the fourth score calculated using the car number. In the present modification, even when the car cannot be specified due to reasons such as that the accuracy of the positioning information transmitted from mobile communication terminal 30 is not good enough, in Modification 6 or 7, for example, the size of the influence of the accident represented by the accident information can be determined by calculating the total score.

3-9. Modification 9

For the train service information, items other than the items included in the embodiments described above may be included, such as an item indicating whether alternative transportation is performed or not, and, an item indicating the train line that is performing the alternative transportation. Here, "alternative transportation" refers to allowing a passenger who has a ticket for the section in which the operation is suspended to get on the train line that is performing the alternative transportation with the ticket. When the alternative transportation is performed, the influence of the accident on the requester may become smaller. In this case, control unit 110 of accident information determination server apparatus 10 determines the score to be 0 when the alternative transportation is performed, and to be 5 when the alternative transportation is not performed. Thus control unit 110 may determine that the influence of the accident information of the train line is larger when no alternative transportation is performed relative to the case when alternative transportation is performed.

3-10. Modification 10

Although control unit 110 of accident information determination server apparatus 10 provides a so-called pull-type service in the embodiments described above, in which it performs the accident information determination processing and transmits the result when requested by mobile communication terminal 30 or on-board display 30*a* as a trigger, control unit 110 also may perform a push-type service. In this case, control unit 110 performs the accident information decision processing at predetermined intervals, when an accident occurs on a predetermined train line, or when a predetermined "service status" occurs, for example, and transmits the result to mobile communication terminal 30 or on-board display 30*a*. Thus, control unit 110 may transmit data, when the predetermined condition described above is satisfied, which indicates that the condition is satisfied to mobile communication terminal 30 or on-board display 30*a*, even without an active request from mobile communication terminal 30 or on-board display 30*a*.

3-11. Modification 11

Although control unit 110 of accident information determination server apparatus 10 acquires train service information from a train service information data transmitted by service information delivery server apparatus 20 in the embodiments described above, control unit 110 may also acquire the train service information by other methods. For example, when service information delivery server apparatuses 20 posts the train service information on Web pages, the operator who operates accident information determination server apparatus 10 may acquire the operation information by inputting the train service information referencing the Web page, by operating operation unit 140 shown by broken lines in FIG. 4.

3-12. Modification 12

In the embodiments described above, although a case where the transport line is a train line, is explained as an example, the present invention may be applied to cases where transport lines of other vehicles such as buses, airplanes, or ships are used, or these vehicles are used by transferring among them. In this case, service information delivery server apparatus 20 is operated by a bus company, an airline company, or a shipping company who operates the vehicles, and its control unit 210 delivers the service information of each vehicle. Also, storage unit 130 of accident information determination server apparatus 10 stores information stored related to train lines of a railroad in the embodiments described above, such as information representing the locations of stops of routes of the vehicles, namely bus stops, airports or boarding points. Here, "stop" refers to the place where a passenger of a vehicle gets on the vehicle or gets off the vehicle. Control unit 110 of accident information determination server apparatus 10 determines the size of the influence of the accident represented by the accident information of each route on the passenger, by performing the processing in steps S13, S16, S19, S22, and the like, shown in FIG. 5, and the processing in steps S36, S37 shown in FIG. 8, or the processing in steps S36a, S37a shown in FIG. 14.

3-13. Modification 13

In embodiments described above, although control unit 110 of accident information determination server apparatus 10, in the processing in step S38 shown in FIG. 8, transmits to mobile communication terminal 30 or on-board display 30a a data indicating the result of the judgment, which is a data indicating accident information, and a total score calculated on the accident information associated with each piece of accident information, the transmitted data here is not limited to these. Control unit 110 may transmit data indicating accident information, and values or signs (such as A, B, C) representing the order of the total score associated with each piece of accident information, or may transmit data arranging accident information in order. Although control unit 110, in the first embodiment described above, transmits the data indicating "train line", "terminal location", and "moving direction" specified in step S36 to mobile communication terminal 30, it is also possible that control unit 110 does not transmit the data, or transmits data indicating other information such as "car number". In short, control unit 110 may transmit data representing information that enables the requester or passenger to understand how large the influence of the accident represented by accident information on them is, when transmitted to the requester by mobile communication terminal 30 or on-board display 30a, or to the passengers on the car that is provided with on-board display 30a.

3-14. Modification 14

The present invention may also be understood as an information processing apparatus such as accident information determination server apparatus 10, a communication terminal such as mobile communication terminal 30 or on-board display 30a, a control apparatus such as control unit 110, 310, 310a of these apparatuses, or an information processing system such as accident information decision system 1 including these. Also, not limited to this, it may also be understood as an information processing method to realize the processing executed by control unit 110, control unit 310, or control unit 310a, or as a program that makes a computer to function as control unit 110, control unit 310, or control unit 310a. These programs may be provided in a form of a storage medium such as an optical disk on which the program is stored, or may be provided in a form in which the program is downloaded to a computer through a network such as the internet, and is installed to be available for usage.

What is claimed is:

1. An information processing apparatus comprising:
an acquiring unit that acquires accident information representing an accident on a transport line in a transport network including a plurality of transport lines, the accident occurring during operation of at least one vehicle, wherein the vehicle is a train including a plurality of cars;
a first specifying unit that specifies a terminal location and a moving direction, the terminal location showing a location of a communication terminal that notifies information to a passenger on one of the vehicles running on one of the transport lines, the moving direction being a direction of the communication terminal on the transport line;
a determination unit that determines an impact of the accident represented by the accident information acquired by the acquiring unit, to the passenger who is moving from the terminal location specified by the first specifying unit in the moving direction;
a transmission unit that transmits the accident information acquired by the acquiring unit and impact information that represents an impact determined by the determination unit for that accident information to the communication terminal,
a first storage unit that stores, for each stop where more than two transport lines are passing, in association, a first transport line that is passing a stop, a second transport line that can be transferred to from the first transport line at the stop, and a first car position, which is a position of a car that requires a shortest transfer time in the train on the first transport line that stops at that stop; and
a second specifying unit that specifies a second car position, which is a position of the car in which the communication terminal resides in the train that stops at the stop,
wherein the determination unit determines that an influence of the accident that has occurred on the second transport line, which is stored in the first storage unit associated with the first transport line and the first car position, is larger on the passenger in a car that is in the second car position, if a difference between the second car position specified by the second specifying unit on the train running on the first transport line and the first car position stored in the first storage unit associated with the first transport line is in a predetermined range, than in a case where the difference is not in the predetermined range.

2. The information processing apparatus according to claim 1,
wherein the determination unit specifies a distance of a shortest transport line route for the passenger who moves from the terminal location specified by the first specifying unit in the moving direction to a stop where more than one transport line is passing, and the determination unit determines that the shorter the specified distance, the larger the influence that is exerted on the passenger by the accident that has occurred on the transport line that can be transferred to at the stop when the passenger has moved on the shortest transport line route for which the distance is specified.

3. The information processing apparatus according to claim 1,
wherein the determination unit specifies a number of times the passenger changes vehicles on a transport line route in which a number of transfers that the passenger makes who moves from the terminal location specified by the first specifying unit in the moving direction to a stop where more than one transport lines is passing is minimal, and
the determination unit determines that the lower that number of times, the larger the influence exerted on the passenger by the accident that has occurred on the transport line that can be transferred to at the stop when the passenger has moved on the transport line route.

4. The information processing apparatus according to claim 1, further comprising:
a second storage unit that stores, in association, sections of respective transport lines, and numbers of passengers using respective sections at predetermined time slots,
wherein the determination unit specifies a time when the passenger is estimated to make a transfer, if the passenger moving from the terminal location specified by the first specifying unit in the moving direction changes transport lines at a stop where more than one transport line is passing, among the number of passengers stored in the second storage unit associated with the sections including the stop in the transport line to be transferred to,
the determination unit references the number of passengers corresponding to the time slot including the specified time in the second storage unit, and
the determination unit determines that the larger the referenced number of passengers is, the larger an influence that is exerted on the passenger by the accident that has occurred on the transport line to be transferred to.

5. The information processing apparatus according to claim 1, further comprising:
a third storage unit that stores, in association, sections of respective transport lines, and numbers of passengers in each section corresponding to the moving direction and a time slot of the vehicle,
wherein the determination unit specifies the sections included in a shortest transport line route for the passenger who moves from the terminal location specified by the first specifying unit in the moving direction to a stop where more than one transport line is passing, and a time when the passenger is estimated to use a respective section when the passenger has moved on the shortest transport line route,
the determination unit performs processing that calculates a value that is a number of passengers corresponding to the moving direction in the section at the specified time when the passengers have moved on the shortest transport line route, among the number of passengers stored in the third storage unit associated with the specified sections, divided by a distance of a part included in the shortest transport line route among the sections, and
the determination unit determines that a larger value calculated by performing the processing on respective sections included in the shortest transport line route indicates a larger influence exerted on the passenger by the accident that has occurred on the transport line to be transferred to at the stop when the passenger has moved on the shortest transport line route.

6. The information processing apparatus according to claim 1, further comprising:
a fourth storage unit that stores, in association, a reason why the accident occurs, and a time required to resolve the accident due to that reason,
wherein the accident information includes a time of occurrence when the accident has occurred, and the reason why the accident has occurred,
the determination unit specifies a first time when the passenger who moves along a shortest transport line route from the terminal location specified by the first specifying unit in the moving direction, and reaches a stop where more than one transport line is passing,
the determination unit specifies a second time when a time has elapsed that is stored in the fourth storage unit in association with the reason included in the accident information, from the time of occurrence included in the accident information acquired by the acquiring unit, and
the determination unit determines that, if the second time is later than the specified first time, then, the larger a difference between the first time and the second time, the larger an influence that is exerted on the passenger by the accident that has occurred on the transport line that can be transferred to at the stop when the passenger has moved on the shortest transport line route.

7. The information processing apparatus according to claim 1,
wherein the determination unit specifies a time loss that the passenger suffers when the passenger uses the transport line on which the accident has occurred that is represented by the accident information, and determines that larger specified loss, a larger influence is exerted on the passenger by the accident represented by the accident information.

8. A computer-readable non-transitory storage medium storing a program, the program causing a computer to execute a process, the process comprising:
acquiring accident information representing an accident on a transport line in a transport network including a plurality of transport lines, the accident occurring during operation of at least one vehicle, wherein the vehicle is a train including a plurality of cars;
specifying a terminal location and a moving direction, the terminal location showing a location of a communication terminal, the moving direction being a direction to which the communication terminal is moving;
determining an impact of the accident represented by the acquired accident information has on the passenger who is moving from the specified terminal location in the moving direction;
transmitting the acquired accident information and, associated with the accident information, impact information that represents the impact determined for that accident information to the communication terminal;
storing, for each stop where more than two transport lines are passing, in association, a first transport line that is passing a stop, a second transport line that can be transferred to from the first transport line at the stop, and a first car position, which is a position of a car that requires a shortest transfer time in the train on the first transport line that stops at that stop;
specifying a second car position, which is a position of the car in which the communication terminal resides in the train that stops at the stop; and determining that an influence of the accident that has occurred on the second transport line, which is stored associated with the first transport line and the first car position, is larger on the passenger in a car that is in the second car position, if a difference between the specified second car position on the train running on the first transport line and the stored first car position associated with the first transport line is in a predetermined range, than in a case where the difference is not in the predetermined range.

* * * * *